(12) United States Patent
Zhao et al.

(10) Patent No.: US 10,567,801 B2
(45) Date of Patent: Feb. 18, 2020

(54) METHOD AND APPARATUS FOR VIDEO CODING WITH PRIMARY AND SECONDARY TRANSFORMS

(71) Applicant: Tencent America LLC, Palo Alto, CA (US)

(72) Inventors: Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/198,462

(22) Filed: Nov. 21, 2018

(65) Prior Publication Data

US 2019/0281321 A1 Sep. 12, 2019

Related U.S. Application Data

(60) Provisional application No. 62/639,998, filed on Mar. 7, 2018.

(51) Int. Cl.
*H04N 7/12* (2006.01)
*H04N 19/61* (2014.01)
(Continued)

(52) U.S. Cl.
CPC ........... *H04N 19/61* (2014.11); *H04N 19/159* (2014.11); *H04N 19/176* (2014.11);
(Continued)

(58) Field of Classification Search
CPC ...... H04N 19/61; H04N 19/46; H04N 19/186; H04N 19/625; H04N 19/159; H04N 19/176
(Continued)

(56) References Cited

U.S. PATENT DOCUMENTS 8,526,495 B2 9/2013 Liu et al.
9,049,452 B2 6/2015 Liu et al.
(Continued)

OTHER PUBLICATIONS

Shan Liu et al., "Rectangular Partitioning for Intra Prediction in HEVC"—Jan. 2012. MediaTek USA Inc., 8 pages.
(Continued)

*Primary Examiner* — Richard T Torrente
(74) *Attorney, Agent, or Firm* — Oblon, McClelland, Maier & Neustadt, L.L.P.

(57) ABSTRACT

Aspects of the disclosure provide method and apparatus for video coding. In some examples, an apparatus includes processing circuitry. The processing circuitry determines an intra prediction mode for generating a prediction image of a current block, determines one or more primary transforms according to signaling information that is extracted from a coded video bitstream, and determines a secondary transform according to the determined intra prediction mode and the determined one or more primary transforms. The processing circuitry also reconstructs a residue image of the current block based on one or more coefficients of an input block extracted from the coded video bitstream, the determined one or more primary transforms, and the determined secondary transform. The processing circuitry then reconstructs an image of the current block based on the prediction image and the residue image of the current block.

13 Claims, 15 Drawing Sheets

(51) Int. Cl.
  *H04N 19/159*  (2014.01)
  *H04N 19/625*  (2014.01)
  *H04N 19/176*  (2014.01)
  *H04N 19/186*  (2014.01)
  *H04N 19/46*   (2014.01)

(52) U.S. Cl.
  CPC ........... *H04N 19/186* (2014.11); *H04N 19/46* (2014.11); *H04N 19/625* (2014.11)

(58) Field of Classification Search
  USPC .................................................. 375/240.12
  See application file for complete search history.

(56) References Cited

U.S. PATENT DOCUMENTS

| | | | |
|---|---|---|---|
| 9,510,012 | B2 | 11/2016 | Liu et al. |
| 9,769,472 | B2 | 9/2017 | Liu et al. |
| 9,788,018 | B2 | 10/2017 | Liu et al. |
| 9,813,726 | B2 | 11/2017 | Liu et al. |
| 2016/0219290 | A1 | 7/2016 | Zhao et al. |
| 2017/0094313 | A1 | 3/2017 | Zhao et al. |
| 2017/0214912 | A1* | 7/2017 | Cote ........................ H04N 19/11 |
| 2017/0324643 | A1* | 11/2017 | Seregin .................. H04N 19/11 |
| 2018/0020218 | A1 | 1/2018 | Zhao et al. |
| 2018/0103252 | A1* | 4/2018 | Hsieh .................... H04N 19/122 |
| 2018/0332289 | A1* | 11/2018 | Huang .................. H04N 19/139 |

OTHER PUBLICATIONS

Shan Liu et al., Rectangular (2NxN and Nx2N) Intra Prediction, Joint Collaborative Team on Video Coding (JCT-VC) of ITU-T SG16 WP3 and ISO/IEC JTC1/SC29/WG11, Geneva, Nov. 21-30, 2011, 6 pages.

X. Cao et al., AHG16-Unification of SDIP and NSQT, Joint Collaborative Team on Video Coding (JCT-VC) of ITU-T SG16 WP3 and ISO/IEC JTC1/SC29/WG11, $7^{th}$ Meeting, San Jose, CA, Feb. 1-10, 2012, 9 pages.

Adam Wieckowski et al., AHG10: Updated NextSoftware as an alternative implementation of the Joint Exploration Model (JEM), Joint Video Exploration Team (JVET) of ITU-T SG 16 WP 3 and ISO/IEC JTC 1/SC 29-WG 11, $9^{th}$ Meeting, Gwangju, KR, Jan. 20-26, 2018. 4 pages.

Notification of Transmittal of the International Search Report and the Written Opinion of the International Searching Authority, or the Declaration; dated May 13, 2019 in Application No. PCT/US2019/021023, 9 pages.

* cited by examiner

METHOD AND APPARATUS FOR VIDEO CODING WITH PRIMARY AND SECONDARY TRANSFORMS

INCORPORATION BY REFERENCE

This present disclosure claims the benefit of priority to U.S. Provisional Application No. 62/639,998, "UNIFICATION AND SIMPLIFICATION ON PRIMARY AND SECONDARY TRANSFORMS" filed on Mar. 7, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example, MPEG-2 generation coding technologies does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring samples values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 35 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower right of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in Y dimension (e.g., row index) and its position in X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 is a schematic 201 that depicts 65 intra prediction directions according to JEM to illustrate the increasing number of prediction directions over time.

The mapping of an intra prediction direction to bits in the coded video bitstream that represent the direction can be different from video coding technology to video coding technology; and can range, for example, from simple direct mappings of prediction direction to intra prediction mode to codewords, to complex adaptive schemes involving most probable modes and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide method and apparatus for video coding. In some examples, an apparatus includes processing circuitry that determines an intra prediction mode for generating a prediction image of a current block, determines one or more primary transforms according to signaling information that is extracted from a coded video bitstream, and determines a secondary transform according to the determined intra prediction mode and the determined one or more primary transforms. The processing circuitry reconstructs a residue image of the current block based on one or more coefficients of an input block extracted from the coded video bitstream, the determined one or more primary transforms, and the determined secondary transform. Also, the processing circuitry reconstructs an image of the current block based on the prediction image and the residue image of the current block.

In some examples, the processing circuitry determines whether to perform a secondary transform process using the secondary transform based on the one or more primary transforms. In some examples, the processing circuitry determines the secondary transform and reconstructs the residue image of the current block based on the determined secondary transform when the secondary transform process is determined to be performed.

In some examples, the processing circuitry determines one of a plurality of pairs of a horizontal transform and a vertical transform when determining the one or more primary transforms. In some examples, the processing circuitry identifies one of a plurality of secondary transforms that is associated with a combination of the intra prediction mode and the one of the plurality of pairs of the horizontal transform and the vertical transform, and each of the plurality of secondary transforms is associated with a different one of the pairs of the horizontal transform and the vertical transform.

In some examples, the processing circuitry determines a pair of a horizontal transform and a vertical transform being DCT-II (Discrete Cosine Transform—Type II) transforms when a first flag extracted from the coded video bitstream has a first value. In at least one embodiment, the processing circuitry determines that a secondary transform process using the secondary transform is not to be performed when the first flag extracted from the coded video bitstream has the first value.

In at least another embodiment, the processing circuitry determines the pair of the horizontal transform and the vertical transform based on a transform index extracted from the coded video bitstream when the first flag extracted from the coded video bitstream has a second value, and the determining the secondary transform is performed according to the intra prediction mode and the pair of the horizontal transform and the vertical transform when the first flag extracted from the coded video bitstream has the second value.

In at least another embodiment, the horizontal transform is a default horizontal transform and the vertical transform is a default vertical transform, when the first flag extracted from the coded video bitstream has a second value, and the one or multiple coefficients of the input block correspond to one of less than a number of coefficients of which a quantized level is less than a threshold and no non-zero coefficient in a high frequency region. The processing circuitry determines the secondary transform according to the intra prediction mode, the default horizontal transform, and the default vertical transform when the first flag extracted from the coded video bitstream has the second value.

In at least one example, the current block is a chroma block, and the determining the one or more primary transforms is performed based on the determined intra prediction mode, one or more primary transforms determined for one or more collocated luma blocks according to the signaling information extracted from the coded video bitstream, and one or more secondary transforms determined for the one or more collocated luma blocks.

In at least one example, the current block is a chroma block, and the determining the one or more primary transforms is performed based on one or more primary transforms determined for one or more collocated luma blocks and one or more secondary transforms determined for the one or more collocated luma blocks, only when the current block has a chroma component predicted by a Direct Mode.

In some embodiments, the determining the one or more primary transforms includes determining a pair of a horizontal transform and a vertical transform only from candidate transforms including a DCT-II (Discrete Cosine Transform—Type II) transform and a DST-VII (Discrete Sine Transform—Type VII) transform based on a transform index extracted from the coded video bitstream, and the reconstructing the residue image is performed further based on performing a permutation process after performing the primary transform process, the permutation process being determined based on the determined intra prediction mode and the transform index.

In some embodiments, the determining the one or more primary transforms includes determining a pair of a horizontal transform and a vertical transform based on the intra prediction mode and a transform index extracted from the coded video bitstream when the intra prediction mode corresponds to one of a vertical mode and a horizontal mode.

In some embodiments, the determining the one or more primary transforms includes, when the coded video bitstream includes the transform index that is for only one of a horizontal transform and a vertical transform, determining the one of the horizontal transform and the vertical transform based on the transform index extracted from the coded video bitstream, and determining the other one of the horizontal transform and the vertical transform to be a default transform.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
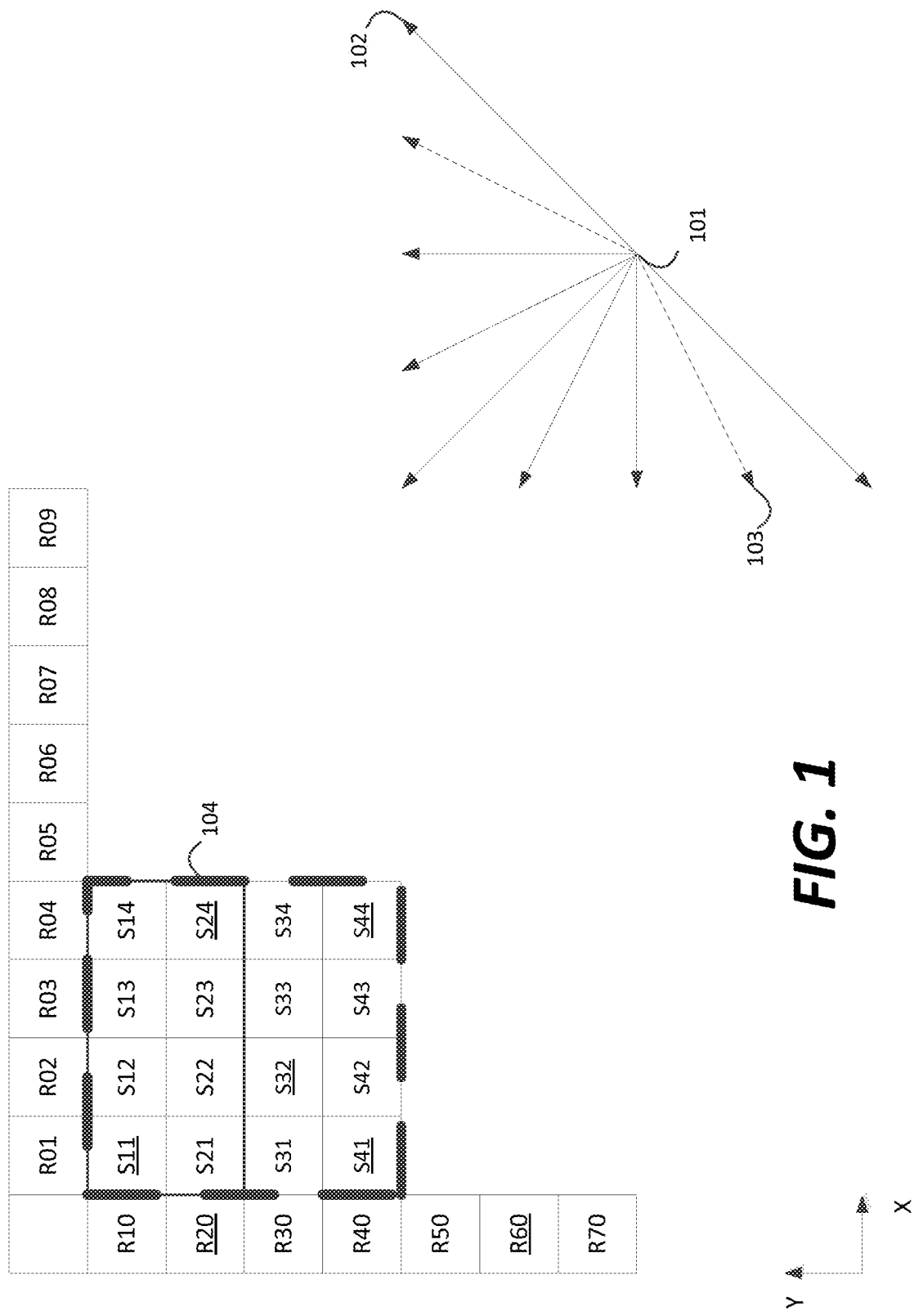
FIG. 1 is a schematic illustration of a subset of intra prediction modes in accordance with H.265.
Figure 2:
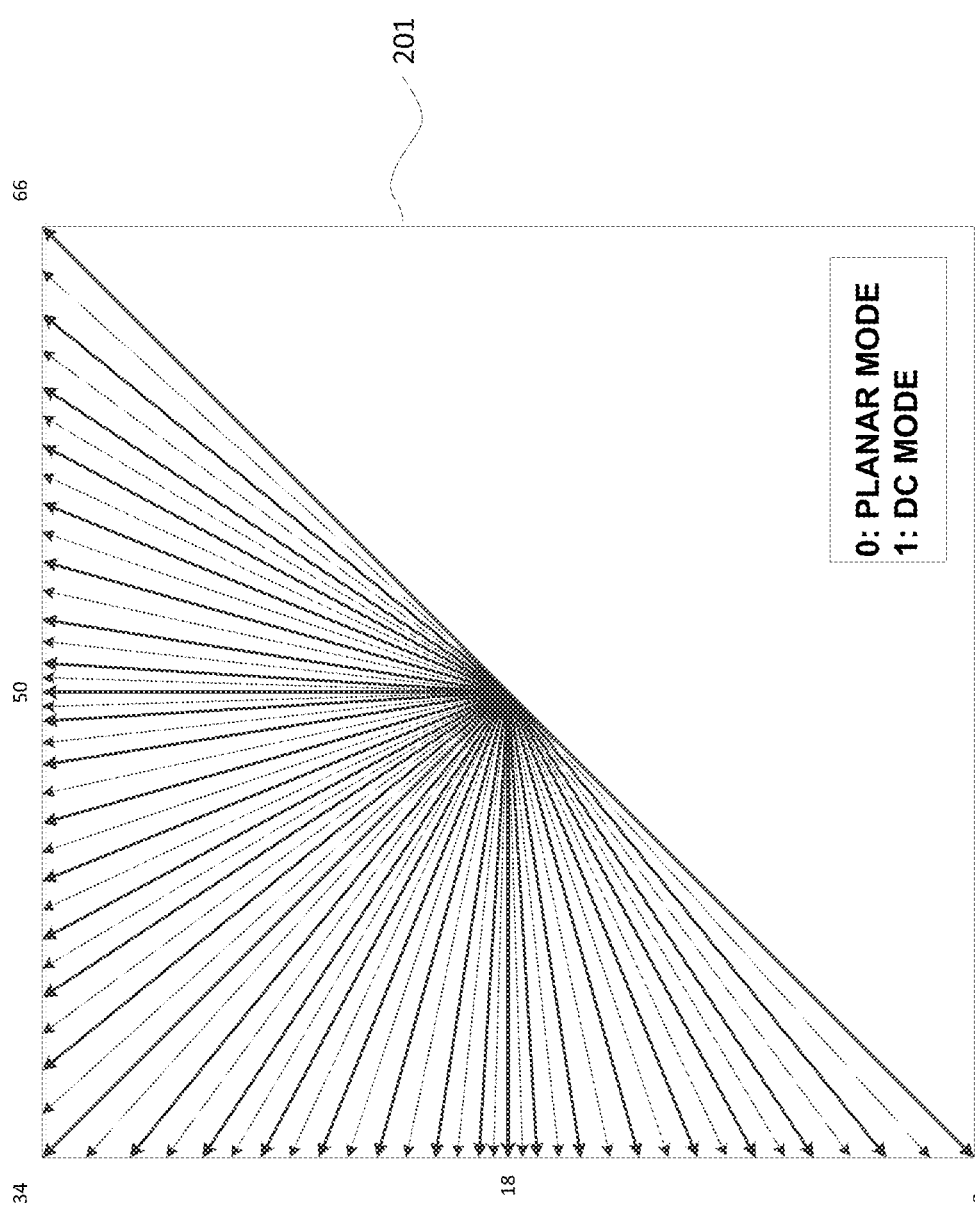
FIG. 2 is an illustration of intra prediction directions according to JEM.
Figure 3:
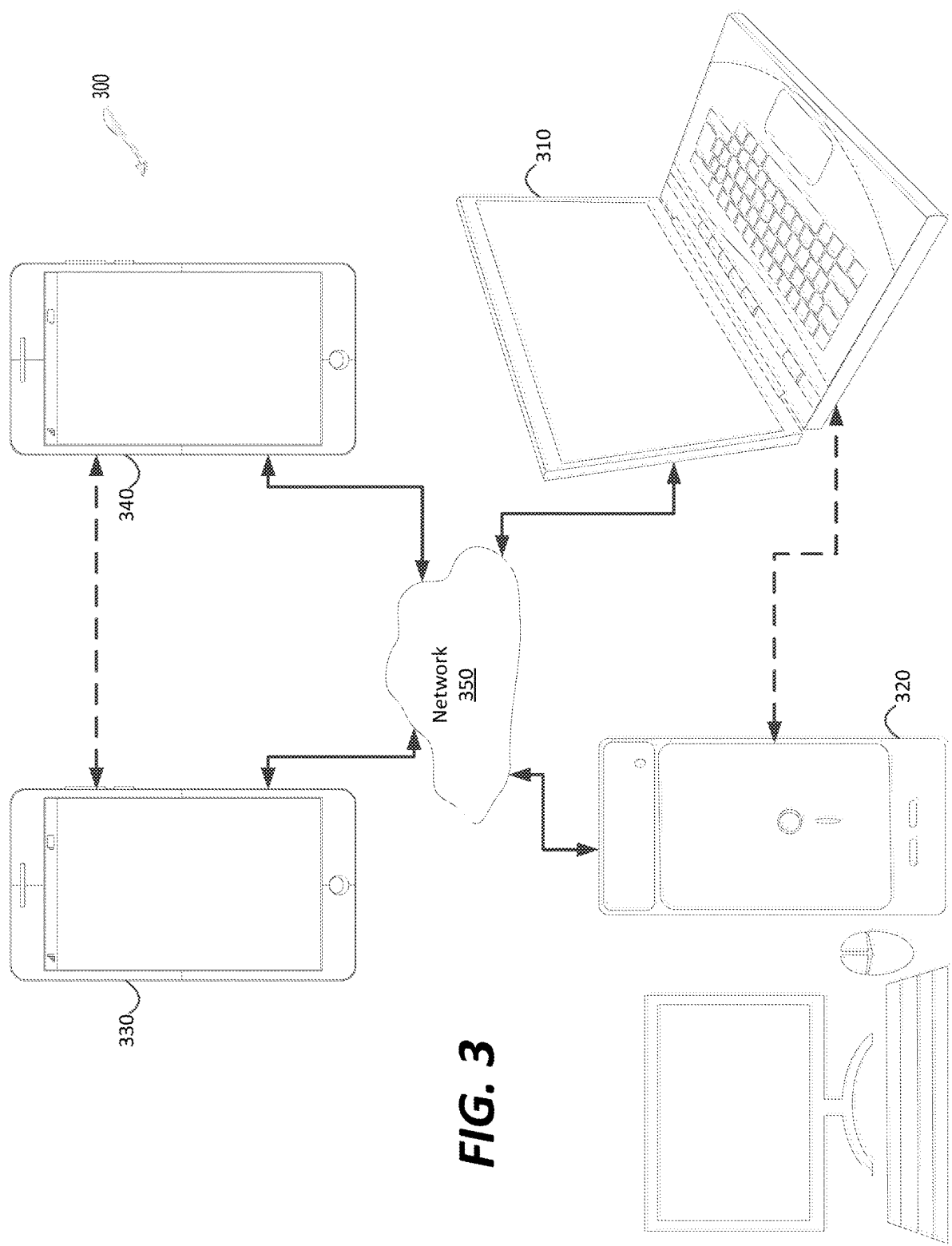
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330), and (340) may be illustrated as servers, personal computers, and smart phones, but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330), and (340), including for example wireline (wired) and/or wireless communication networks. The communication network (350) may exchange data in circuit-switched and/or packet-switched channels. Representative networks include telecommunications networks, local area networks, wide area networks, and/or the Internet. For the purposes of the present discussion, the architecture and topology of the network (350) may be immaterial to the operation of the present disclosure unless explained herein below.

Figure 4:
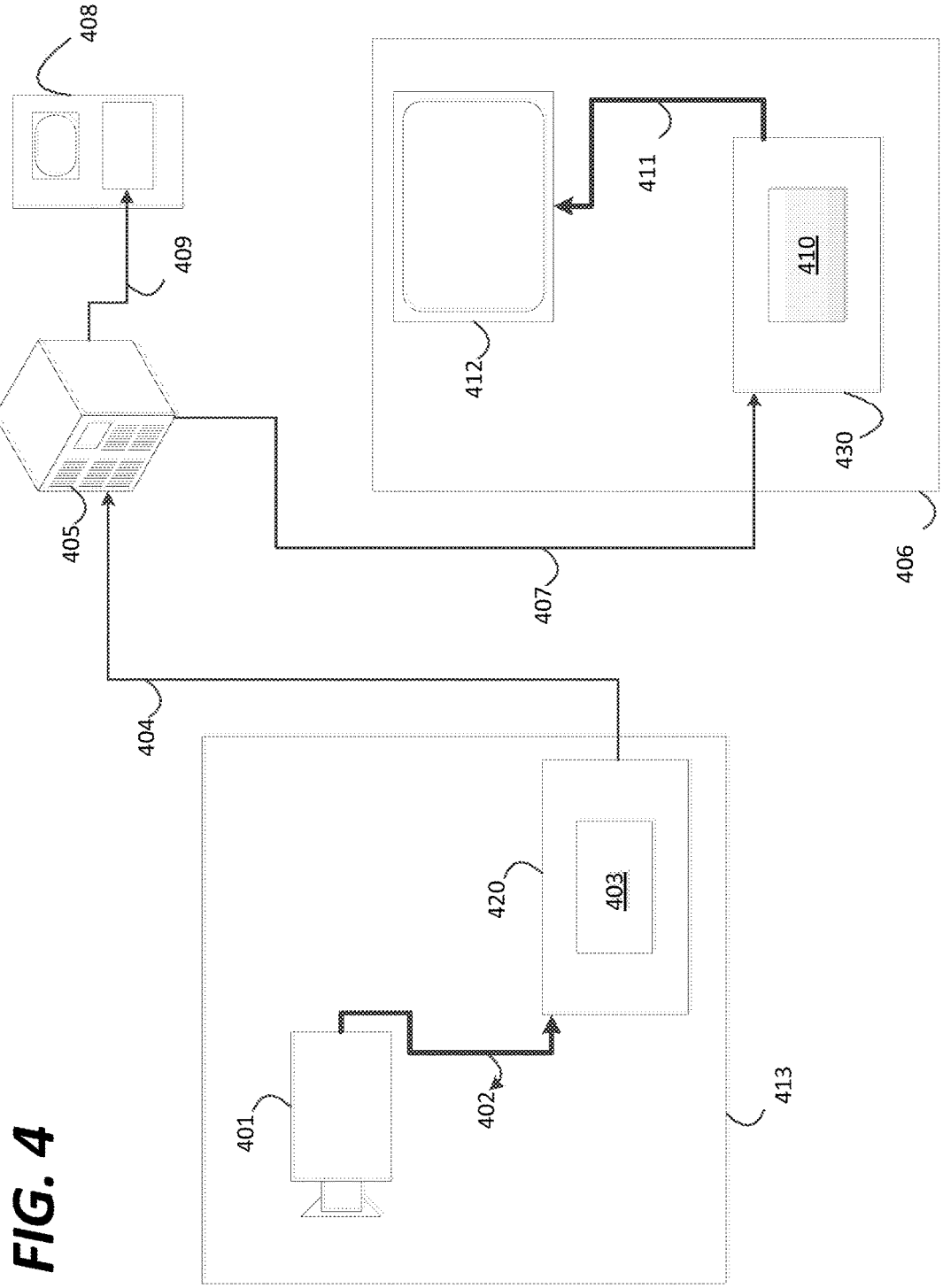
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
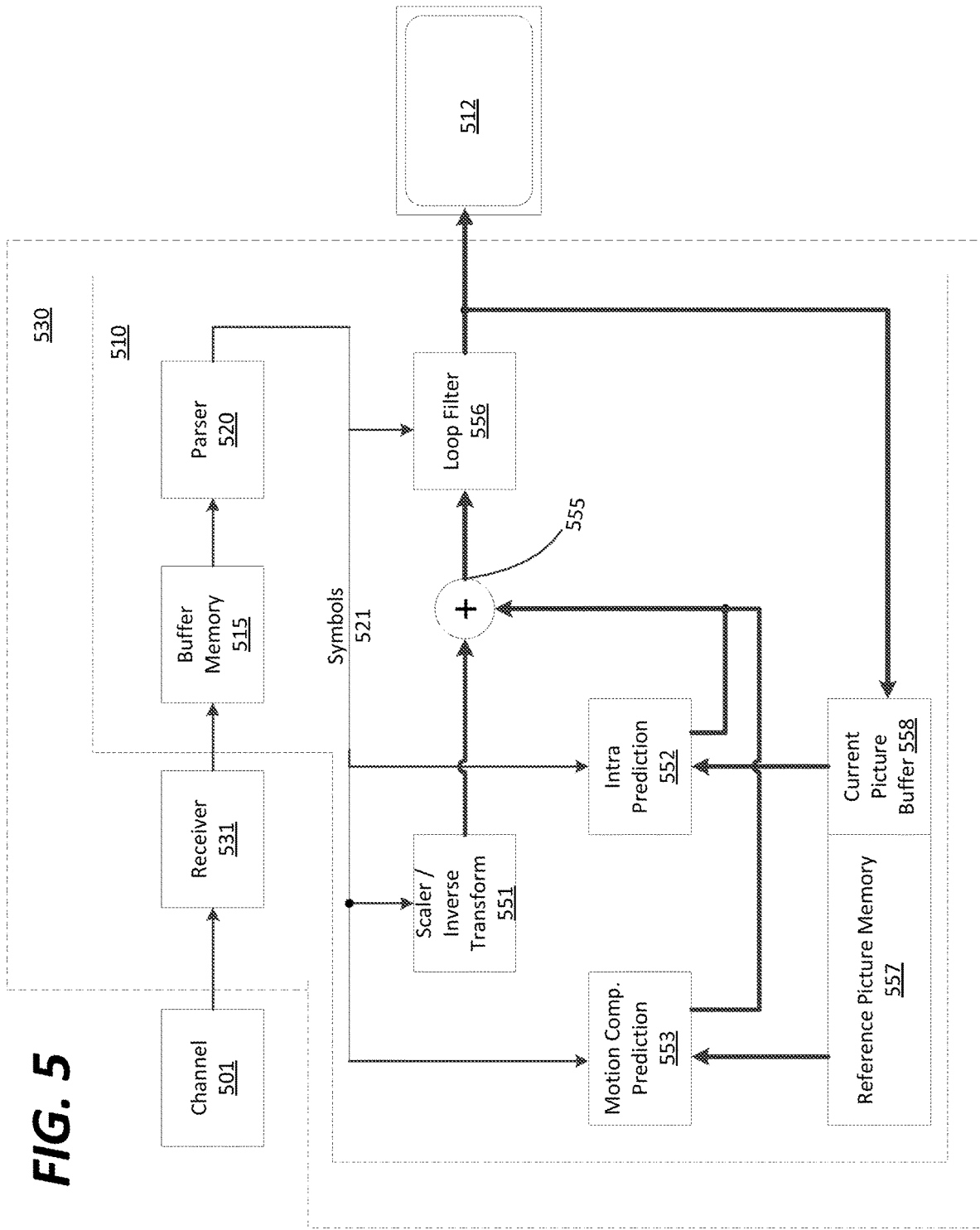
FIG. 5 is a schematic illustration of a simplified block diagram of a decoder (510) in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplementary Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (520) may also extract from the coded video sequence information such as transform coefficients, quantizer parameter values, motion vectors, and so forth.

The parser (520) may perform entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values (also referred to as residue images), that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction (also referred to as an intra prediction image), using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples (also referred to as an inter prediction image) can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
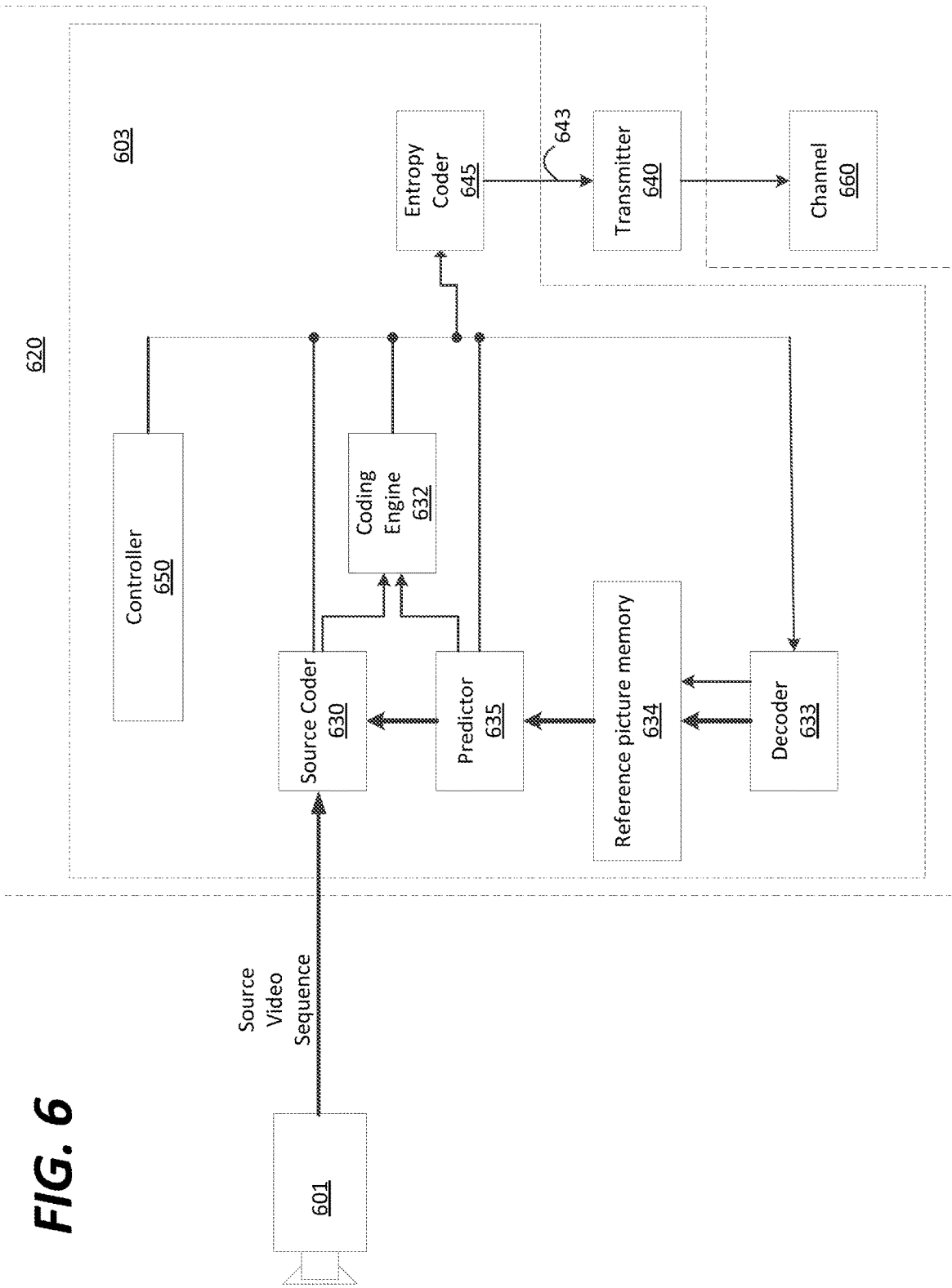
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601)(that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the "local" decoder (633) and the "remote" decoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies known to a person skilled in the art as, for example Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes use of spatial correlation in a given picture, and inter-picture prediction makes use of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 7:
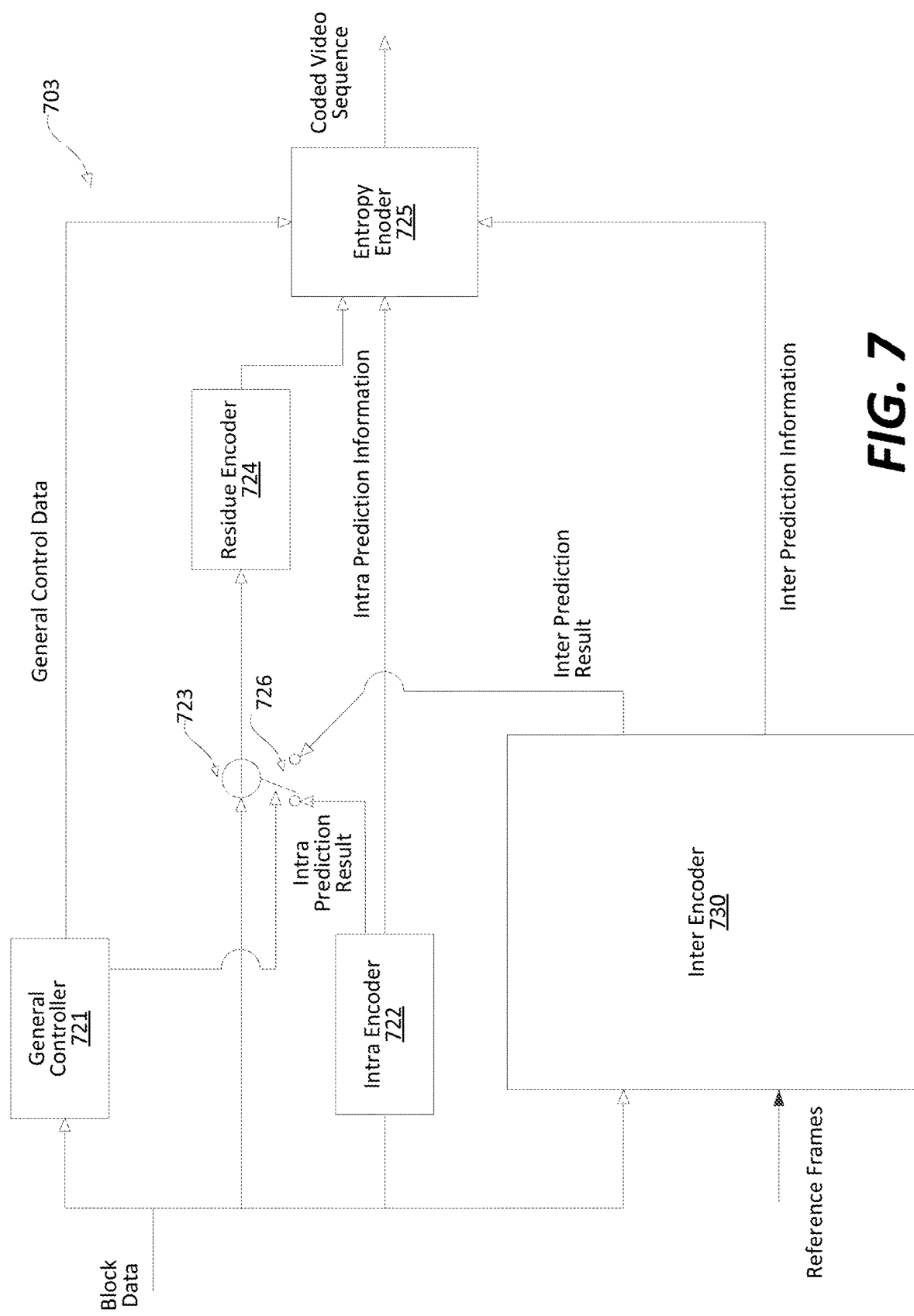
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like (e.g., an image of the block). The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (722) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (721) is configured to determine general control data and control other components of the video encoder (703) based on the general control data. In an example, the general controller (721) determines the mode of the block, and provides a control signal to the switch (726) based on the mode. For example, when the mode is the intra, the general controller (721) controls the switch (726) to select the intra mode result (e.g., an intra prediction image of the block) for use by the residue calculator (723), and controls the entropy encoder (725) to select the intra prediction information and include the intra prediction information in the bitstream; and when the mode is the inter mode, the general controller (721) controls the switch (726) to select the inter prediction result (e.g., an inter prediction image of the block) for use by the residue calculator (723), and controls the entropy encoder (725) to select the inter prediction information and include the inter prediction information in the bitstream.

The residue calculator (723) is configured to calculate a difference (residue data or a residue image) between the received block (e.g., an image of the block) and prediction results (e.g., a prediction mage of the block) selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients.

The entropy encoder (725) is configured to format the bitstream to include the encoded block. The entropy encoder (725) is configured to include various information according to a suitable standard, such as HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
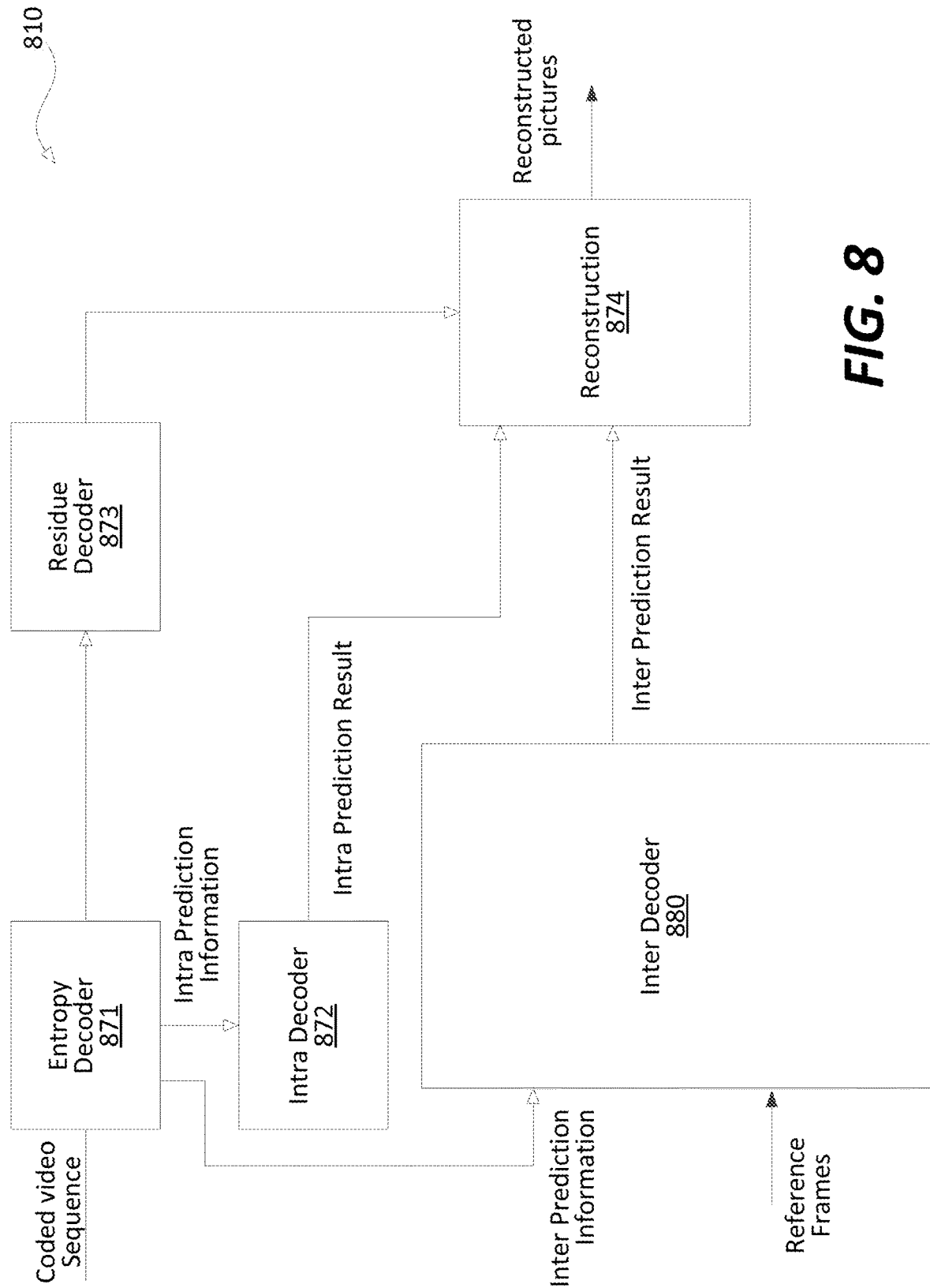
FIG. 8 shows a block diagram of a decoder in accordance with another embodiment.

FIG. 8 shows a diagram of a video decoder (810) according to another embodiment of the disclosure. The video decoder (810) is configured to receive a coded pictures that are part of a coded video sequence, and decode the coded picture to generate a reconstructed picture. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (872) or the inter decoder (880) respectively residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results (e.g., an inter prediction image of a current block) based on the inter prediction information.

The intra decoder (872) is configured to receive the intra prediction information, and generate prediction results (e.g., an intra prediction image of the current block) based on the intra prediction information.

The residue decoder (873) is configured to perform inverse quantization to extract de-quantized transform coefficients, and process the de-quantized transform coefficients to convert the residual from the frequency domain to the spatial domain to obtain a residue image of the current block). The residue decoder (873) may also require certain control information (to include the Quantizer Parameter QP), and that information may be provided by the entropy decoder (871) (datapath not depicted as this may be low volume control information only).

The reconstruction module (874) is configured to combine, in the spatial domain, the residue image of a current block as output by the residue decoder (873) and the prediction results (e.g., a prediction image of the current block) as output by the inter or intra prediction modules as the case may be) to form a reconstructed block (e.g., a reconstructed image of the current block), that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Figure 9:
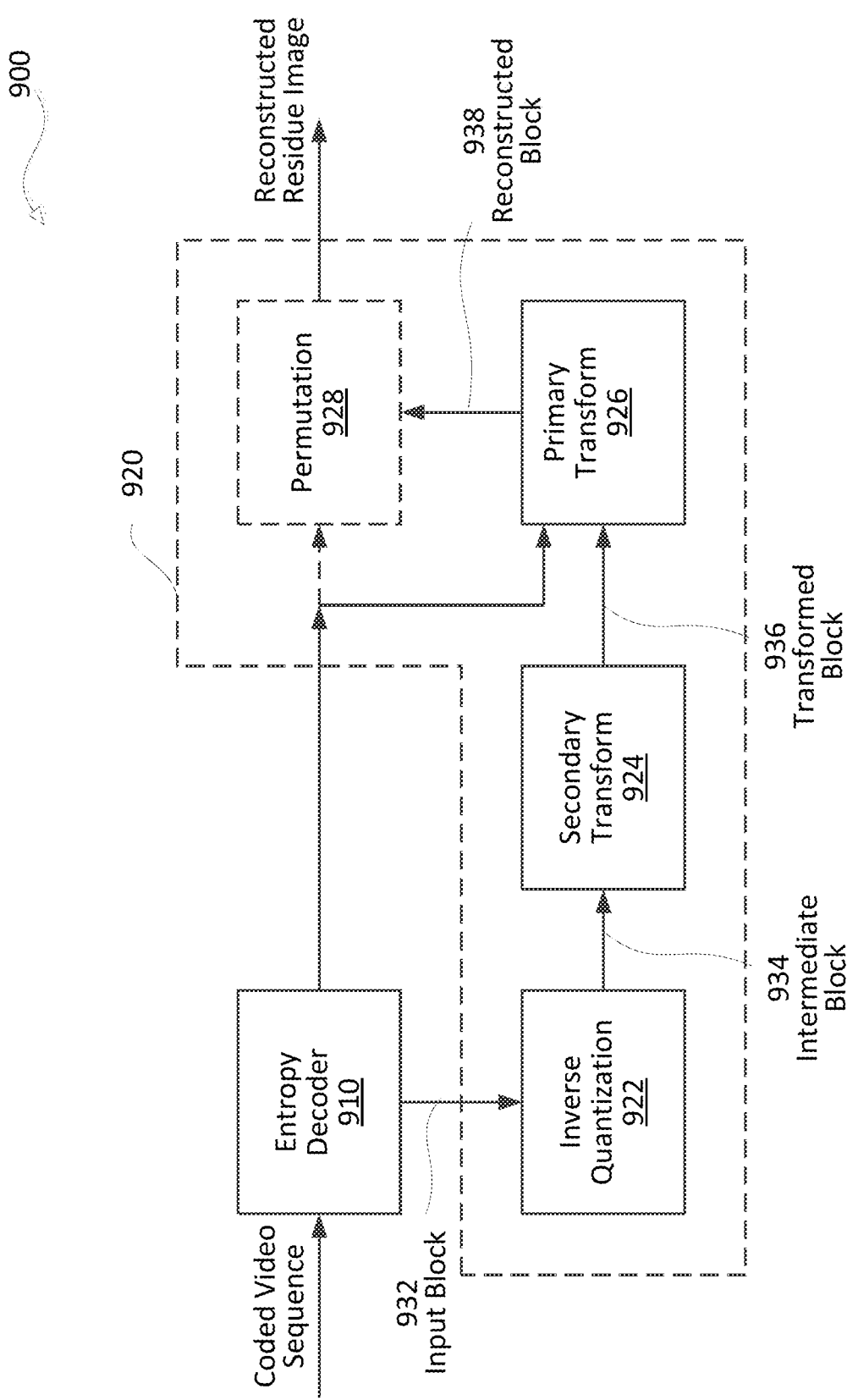
FIG. 9 shows a block diagram of an entropy decoder (910) and a residue decoder (920) in a decoder (900) in accordance with an embodiment.

FIG. 9 shows a block diagram of an entropy decoder (910) and a residue decoder (920) in a decoder (900) in accordance with an embodiment. The decoder (900) is configured to receive coded pictures that are part of a coded video sequence, and decode a coded picture to generate a reconstructed picture. In some examples, the decoder (900) corresponds to the video decoder (410), (510), or (810).

In the FIG. 9 example, the decoder (900) includes an entropy decoder (910) coupled with a residue decoder (920). In some examples, the entropy decoder (910) corresponds to the parser (520) or the entropy decoder (871), and the residue decoder (920) corresponds to the Scaler/Inverse Transform unit (551) or the residue decoder (873). Accordingly, configurations and features of the decoder (900), the entropy decoder (910), and the residue decoder (920) that are the same or similar to those described with reference to FIGS. 4, 5, and 8 may be simplified or omitted. Moreover, in some embodiments, the decoder (900) includes other components in addition to the entropy decoder (910) and the residue decoder (920).

The entropy decoder (910) can receive the coded video sequence and output an input block (932) and corresponding control information to the residue decoder (920). In some examples, the input block (932) includes quantized coefficients that represent an encoded residue image of a current block. The residue decoder (920) can receive one or more coefficients of the input block (932) and reconstruct and output a residue image of the current block based on the one or more coefficients of the input block (932) and the control information.

In the FIG. 9 example, the residue decoder (920) includes an inverse quantization unit (922), a secondary transform unit (924), a permutation unit (926), and a primary transform unit (928). In some examples, not all components of the residue decoder (920) are depicted and illustrated in FIG. 9. Also, various units described herein may be implemented using hardware circuitry, processing circuitry executing instructions, or a combination thereof.

The inverse quantization unit (922) can receive the one or more coefficients of the input block (932) from the entropy decoder (910) and generate an intermediate block (934) that includes rescaled coefficients based on quantization factors and/or quantization scaling matrices from the entropy decoder (910).

The secondary transform unit (924) can perform a secondary transform process based on a secondary transform on a specific portion of the intermediate block (934) to obtain a transformed block (936) that corresponds to a frequency domain representation of the residue image of the current block. In some examples, the specific portion of the intermediate block (934) corresponds to a low frequency portion of the intermediate block (934). In some examples, the specific portion of the intermediate block (934) corresponds to a top-left portion of the intermediate block (934).

The primary transform unit (928) can receive the transformed block (936) and perform a primary transform process based on one or more primary transforms indicated in the control information from the entropy decoder (910) and generate a reconstructed block (938).

The permutation unit (926) can rearrange the reconstructed block (938) based on a permutation process indicated in the control information from the entropy decoder (910) and output a reconstructed residue image of the current block. An image of the current block can be subsequently reconstructed based on the residue image of the current block and a prediction image of the current block that is generated using a prediction scheme, such as an intra prediction or an inter prediction.

In some embodiments, one or more of the secondary transform unit (924) and the permutation unit (926) can be disabled according to the control information or omitted as needed. When the secondary transform unit (924) is disabled or omitted, the output (934) of the inverse quantization unit (922) is used as the transformed block (936). When the permutation unit (926) is disabled or omitted, the output (936) of the primary transform unit (928) is used as the reconstructed residue image.

In some embodiments, a primary transform process performed by a decoder can be an inverse of a corresponding primary transform process performed by an encoder. In some embodiments, a secondary transform process performed by a decoder can be an inverse of a corresponding secondary transform process performed by an encoder.

With respect to the primary transform process, in some examples, the primary transform process can be performed using a horizontal transform and a vertical transform. Various types of transform basis functions can be used for performing the primary transform process. For example, Table 1 shows applicable types of transform basis functions, including DCT-II (Discrete Cosine Transform—Type II), DCT-V (Discrete Cosine Transform—Type V), DCT-VIII (Discrete Cosine Transform—Type VIII), DST-I (Discrete Sine Transform—Type I), and DST-VII (Discrete Sine Transform—Type VII). Of course, other types of transform basis functions may be applicable for residue coding.

TABLE 1

Transform basis functions of DCT-II/V/VIII and DST-I/VII for N-point input

| Transform Type | Basis function $T_i(j)$, $i, j = 0, 1, \ldots, N-1$ |
| --- | --- |
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br><br> where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, <br><br> where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

For example, in addition to DCT-II and 4×4 DST-VII which have been employed in HEVC, an Adaptive Multiple Transform (AMT, or as known as Enhanced Multiple Transform (EMT), or as known as Multiple Transform Selection (MTS)) scheme can be used for residual coding for both inter and intra coded blocks.

In some examples, in order to keep the orthogonality of the transform matrix, the transformed block can be quantized with higher accuracy, such as using 10-bit representation instead of 8-bit in HEVC. To keep the intermediate values of the transformed coefficients within the range of 16-bit, after horizontal and after vertical transform, all the coefficients can be right shifted by two more bits, comparing to the right shift used in the current HEVC transforms.

In some embodiments, the AMT applies to the CUs with both width and height smaller than or equal to 64, and whether AMT applies or not is controlled by a CU level flag. When the CU level flag is equal to 0, DCT-II can be applied in the CU to encode the residue. For a luma coding block within an AMT enabled CU, two additional flags can be signaled to identify the horizontal and vertical transform to be used. In some examples, the residual of a block can be coded with transform skip mode. In some examples, to avoid the redundancy of syntax coding, the transform skip flag is not signaled when the CU level AMT flag is not equal to 0.

For residue coding for an intra coded block, due to the different residual statistics of different intra prediction modes, a mode-dependent transform candidate selection process is used. In some examples, three transform subsets can be defined as shown in Table 2, and the transform subset can be selected based on the intra prediction mode, as shown in Table 3.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

In some embodiments, with the subset concept, a transform subset is first identified based on Table 2 using the intra prediction mode of a CU with the CU-level AMT flag being equal to 1. After that, for each of the horizontal and vertical transform, one of the two transform candidates in the identified transform subset, according to Table 3, can be selected based on explicitly signaled flags.

For residue coding for an inter coded block, in some examples, only one transform set, which includes DST-VII and DCT-VIII, is used for both horizontal and vertical transforms.

With respect to the secondary transform process, a non-separable secondary transform (NSST) can be applied. In some embodiments, NSST is only applied to the low frequency coefficients after the primary transform. In some examples, if both width (W) and height (H) of a transform coefficient block is larger than or equal to 8, then 8×8 NSST is applied to the top-left 8×8 region of the transform coefficients block. Otherwise, if either W or H of a transform coefficient block is equal to 4, a 4×4 NSST is applied and the 4×4 non-separable transform is performed on the top-left min(8,W)×min(8,H) region of the transform coefficient block.

In some embodiments, matrix multiplication implementation of a non-separable transform is described as follows using a 4×4 input block as an example. To apply the non-separable transform, the 4×4 input block X:

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is represented as a vector $\vec{X}$::

$$\vec{X} = [X_{00} X_{01} X_{02} X_{03} X_{10} X_{11} X_{12} X_{13} X_{20} X_{21} X_{22} X_{23} X_{30} X_{31} X_{32} X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block.

In some examples, a Hypercube-Givens Transform (HyGT) with butterfly implementation is used instead of matrix multiplication to reduce the complexity of non-separable transform. For example, the basic elements of this

TABLE 3

Selected (H)orizontal and (V)ertical transform sets for each intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 2 | 1 | 0 | 1 | 0 | 1 | 0 | 1 | 0 | 1 | 0 | 1 | 0 | 1 | 0 | 0 | 0 | 0 |
| H | 2 | 1 | 0 | 1 | 0 | 1 | 0 | 1 | 0 | 1 | 0 | 1 | 0 | 1 | 2 | 2 | 2 | 2 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| V | 0 | 0 | 0 | 0 | 0 | 1 | 0 | 1 | 0 | 1 | 0 | 1 | 0 | 1 | 0 | 1 | 0 |
| H | 2 | 2 | 2 | 2 | 2 | 1 | 0 | 1 | 0 | 1 | 0 | 1 | 0 | 1 | 0 | 1 | 0 |

| Intra Mode | 35 | 36 | 37 | 38 | 39 | 40 | 41 | 42 | 43 | 44 | 45 | 46 | 47 | 48 | 49 | 50 | 51 | 52 |
|---|---|---|---|---|---|---|---|---|---|---|---|---|---|---|---|---|---|---|
| V | 1 | 0 | 1 | 0 | 1 | 0 | 1 | 0 | 1 | 0 | 1 | 2 | 2 | 2 | 2 | 2 | 2 | 2 |
| H | 1 | 0 | 1 | 0 | 1 | 0 | 1 | 0 | 1 | 0 | 1 | 0 | 0 | 0 | 0 | 0 | 0 | 0 |

| Intra Mode | 53 | 54 | 55 | 56 | 57 | 58 | 59 | 60 | 61 | 62 | 63 | 64 | 65 | 66 |
|---|---|---|---|---|---|---|---|---|---|---|---|---|---|---|
| V | 2 | 2 | 1 | 0 | 1 | 0 | 1 | 0 | 1 | 0 | 1 | 0 | 1 | 0 |
| H | 0 | 0 | 1 | 0 | 1 | 0 | 1 | 0 | 1 | 0 | 1 | 0 | 1 | 0 | orthogonal transform are Givens rotations, which are defined by orthogonal matrices G(m, n, θ), which have elements defined by $$G_{i,j}(m, n) = \begin{cases} \cos\theta, & i = j = m \text{ or } i = j = n, \\ \sin\theta, & i = m, j = n, \\ -\sin\theta, & i = n, j = m \\ 1, & i = j \text{ and } i \neq m \text{ and } i \neq n, \\ 0, & \text{otherwise.} \end{cases}$$

Figure 10A:
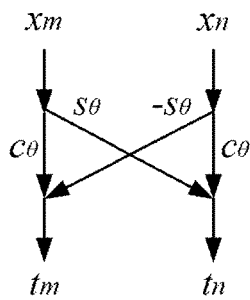
FIG. 10A shows a graphical representation of Givens rotations in accordance with an embodiment.

FIG. 10A shows a graphical representation of Givens rotations in accordance with an embodiment. These transformations can be graphically represented as in FIG. 10A, where $t_m = x_m \cos\theta - x_n \sin\theta$, and $t_n = x_m \sin\theta + x_n \cos\theta$.

Figure 10B:
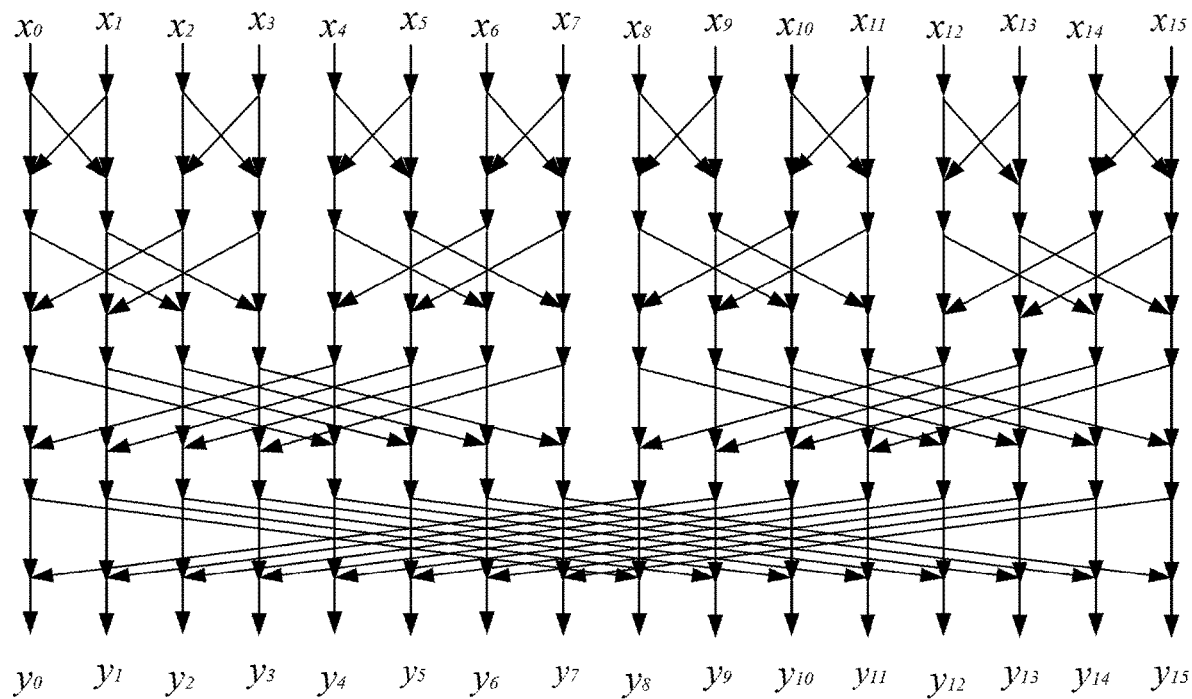
FIG. 10B shows a graphical representation of a Hypercube-Givens Transform based on combinations Givens rotations in accordance with an embodiment.

HyGT can be implemented by combining sets of Givens rotations in a hypercube arrangement. FIG. 10B shows a graphical representation of a Hypercube-Givens Transform based on combinations Givens rotations in accordance with an embodiment. In the FIG. 10B example, HyGT for 16 elements (4×4 non-separable transform) can be calculated based on the "butterfly" shape flowchart. For example, assuming that N is a power of two, a HyGT round is defined as a sequence of log 2(N) passes, where in each pass, the indexes in vectors m and n are defined by edges of a hypercube with dimension log 2(N), sequentially in each direction.

Figure 11:
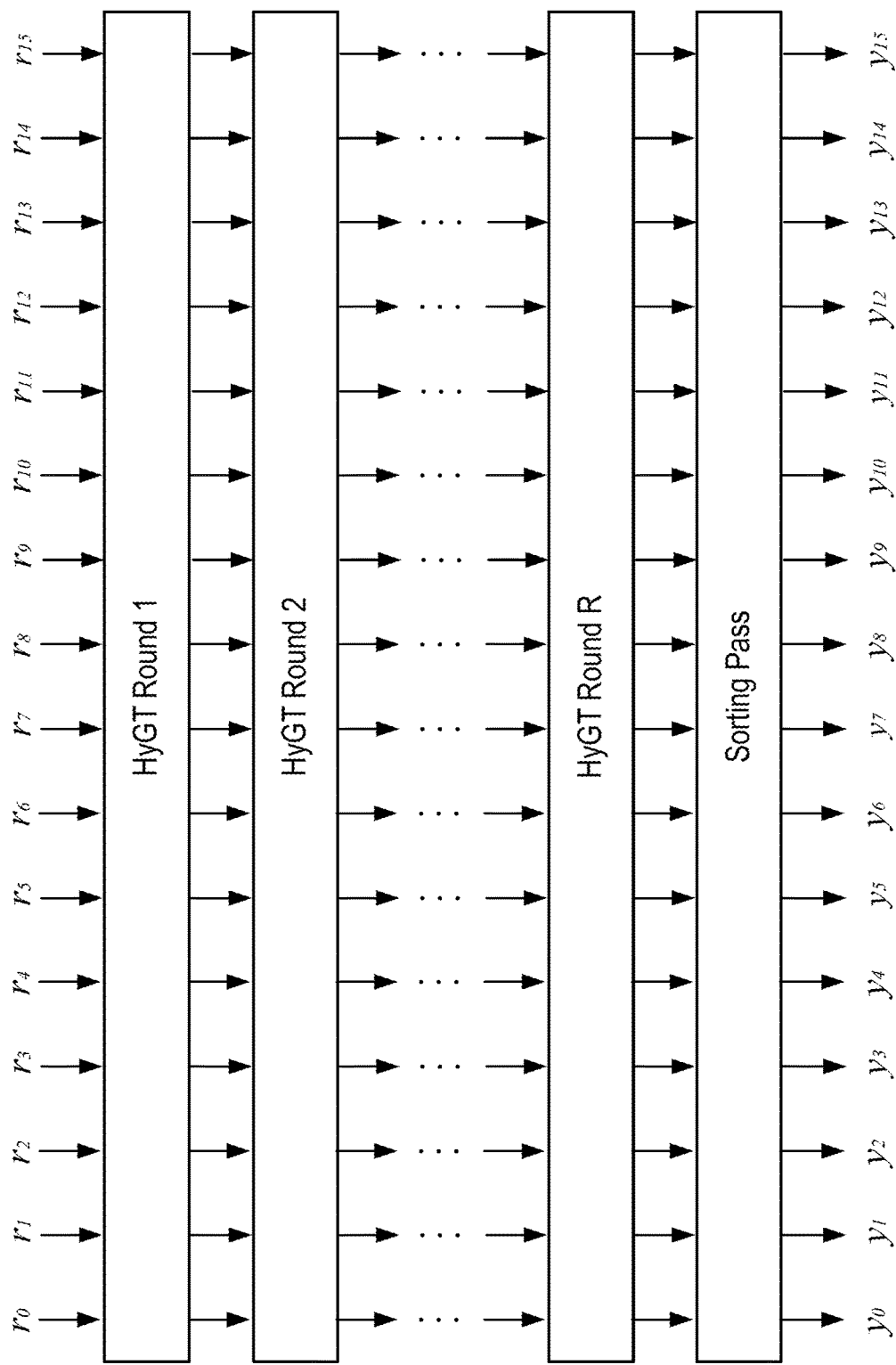
FIG. 11 shows a graphical representation of another Hypercube-Givens Transform based on combinations Givens rotations in accordance with an embodiment.

To obtain good compression, more than one HyGT round can be used. FIG. 11 shows a graphical representation of another Hypercube-Givens Transform based on combinations Givens rotations in accordance with an embodiment. As shown in FIG. 11, a full non-separable secondary transform is composed of R rounds HyGT, and may include an optional permutation pass, to sort transform coefficients according to their variance. In some examples, 2-round HyGT is applied for a 4×4 secondary transform and 4-round HyGT is applied for a 8×8 secondary transform.

In some embodiments, when a current block is intra coded, whether to perform or skip a secondary transform process and/or a secondary transform for performing the secondary transform process can be determined based on at least one or more primary transforms for the primary transform process. Accordingly, in some examples, there is no need to include the parameters for controlling the secondary transform process for a particular intra coded block in the encoded bitstream. In this way, instead of individually signaling parameters for performing the primary transform process and secondary transform process, the secondary transform process is associated with the primary transform process, and the control information is deemed to be signaled for the combination of primary and secondary transform processes.

For example, a decoding controller of the decoder (900) can work with the entropy decoder (932) to determine an intra prediction mode for generating a prediction image of a current block and determine one or more primary transforms according to signaling information that is extracted from the coded video sequence or a coded video bitstream. The decoding controller can further determine whether to perform a secondary transform process using the secondary transform based on the one or more primary transforms.

In some examples, when it is determined that the secondary transform process is to be performed, the decoding controller of the decoder (900) can determine a secondary transform according to the determined intra prediction mode and the determined one or more primary transforms. The residue decoder (920) can reconstruct a residue image of the current block based on one or more coefficients of an input block extracted from the coded video bitstream, the determined one or more primary transforms, and the determined secondary transform.

In some examples, when it is determined that the secondary transform process is not to be performed, the residue decoder (920) can reconstruct the residue image of the current block based on the one or more coefficients of the input block and the determined one or more primary transforms, and skip the secondary transform process.

After reconstructing the residue of the current block, the decoder (900) can reconstruct an image of the current block based on the prediction image and the residue image of the current block.

In one example embodiment, when DCT-II is used as the primary horizontal and vertical transform, a secondary transform is not used or signaled, or a secondary transform is not signaled but used, or a secondary transform is not signaled but the usage of the secondary transform is inferred from decoded information. In some examples, the secondary transform can be determined based on at least one or more of: a block height, a block width, a block shape, transform coefficients, and an intra prediction direction.

In another example embodiment, one secondary transform is associated with only one pair of horizontal/vertical transform types. In some examples, one secondary transform can be used for multiple intra prediction modes.

In another example embodiment, one transform flag is signaled to indicate whether a default transform, e.g., DCT-II, is used. For example, when the transform flag is 0, DCT-II is used for both horizontal and vertical transform, and no secondary transform is applied. On the other hand, if the transform flag is 1, a transform index may be further signaled to indicate which combination of a primary and a secondary transform is applied.

In some embodiments, if the transform block representing the residue image of the current block is not coded by a transform skip mode, under certain conditions, neither the transform flag nor the transform index is signaled, and only DCT-II is used. The condition may include one or more of, but not limited to: (i) the transform block has less than N (e.g., 1, 2 or 3) coefficients of which the quantized level is less than a given threshold (e.g., 1, 2 or 3), and (ii) the transform block does not have a non-zero coefficient at a certain position, e.g., a high frequency portion thereof.

In some embodiments, if the transform block is not coded by a transform skip mode, under certain conditions, the transform flag is still signaled, but the transform index is not signaled and a default combination of the primary transform and the secondary transform is used. The condition includes one or more of, but not limited to: (i) the transform block has less than N (e.g., 1, 2 or 3) coefficients of which the quantized level is less than a given threshold (e.g., 1, 2 or 3), and (ii) the transform block does not have a non-zero coefficient at a certain position, e.g., a high frequency portion thereof.

In some embodiments, if the transform block is not coded by a transform skip mode, under certain conditions, only primary transform is used and secondary transform is not used. The condition includes one or more of, but not limited to: (i) the transform block has less than N (e.g., 1, 2 or 3) coefficients of which the quantized level is less than a given threshold (e.g., 1, 2 or 3), and (ii) the transform block does not have a non-zero coefficient at a certain position, e.g., a high frequency portion thereof.

In some examples, when the current block is a chroma block, the primary transform and/or secondary transform for the current chroma block can be inferred from various settings for one or more collocated luma blocks. Therefore, the transform signaling scheme for luma and chroma blocks can be unified.

In one embodiment, the transform signaling is not applied for chroma blocks, and the primary and secondary transforms for a chroma block are derived according to the primary and secondary transform applied on the collocated luma blocks and the chroma intra prediction direction.

In some embodiments, the derivation is applied only when chroma component is predicted by Direct Mode (i.e., DM mode, where the intra prediction mode for a chroma block is the same as the intra prediction mode for a collocated luma block). In some embodiments, if the intra prediction mode of the chroma block is Luma-based Mode (i.e., LM mode, where the intra prediction mode for a chroma block is inferred based on the intra prediction mode for a collocated luma block), the primary and secondary transforms associated with other default intra mode, e.g., Planar or DC mode, are used.

In some embodiments, the primary transform is determined from candidate transforms including a DCT-II (Discrete Cosine Transform—Type II) transform and a DST-VII (Discrete Sine Transform—Type VII) transform based on a transform index extracted from the coded video bitstream. At the decoder (900), a permutation method, such as flipping the elements in each row/column or reordering rows/column, is first selected based on the intra prediction modes and signaled transform index, then the permutation is applied by the permutation unit (926) after performing the primary inverse transform process by the primary transform unit (928).

In some embodiments, the signaling of primary transform may be mode dependent for some intra prediction modes. In some embodiments, only vertical or horizontal transform may be signaled for some intra prediction modes. In some embodiments, instead of signaling vertical and horizontal transform independently, only pre-defined vertical and horizontal transform pairs are signaled.

In one example, when the transform type is not signaled for horizontal (or vertical) direction, a default transform type, e.g., DST-VII or DST-IV, is used for the horizontal (or vertical) direction. In some examples, DST-IV has a basis function based on at least the term of $$\sin\left(\frac{\pi}{N}\left(i+\frac{1}{2}\right)\cdot\left(j+\frac{1}{2}\right)\right).$$

In another exemplarily embodiment, for vertical intra prediction, e.g., intra prediction mode index 26 in HEVC and intra prediction mode index 50 in JEM, only horizontal transform selection is signaled.

In another exemplarily embodiment, for horizontal intra prediction, e.g., intra prediction mode index 10 in HEVC and intra prediction mode index 18 in JEM, only vertical transform selection is signaled.

Figure 12:
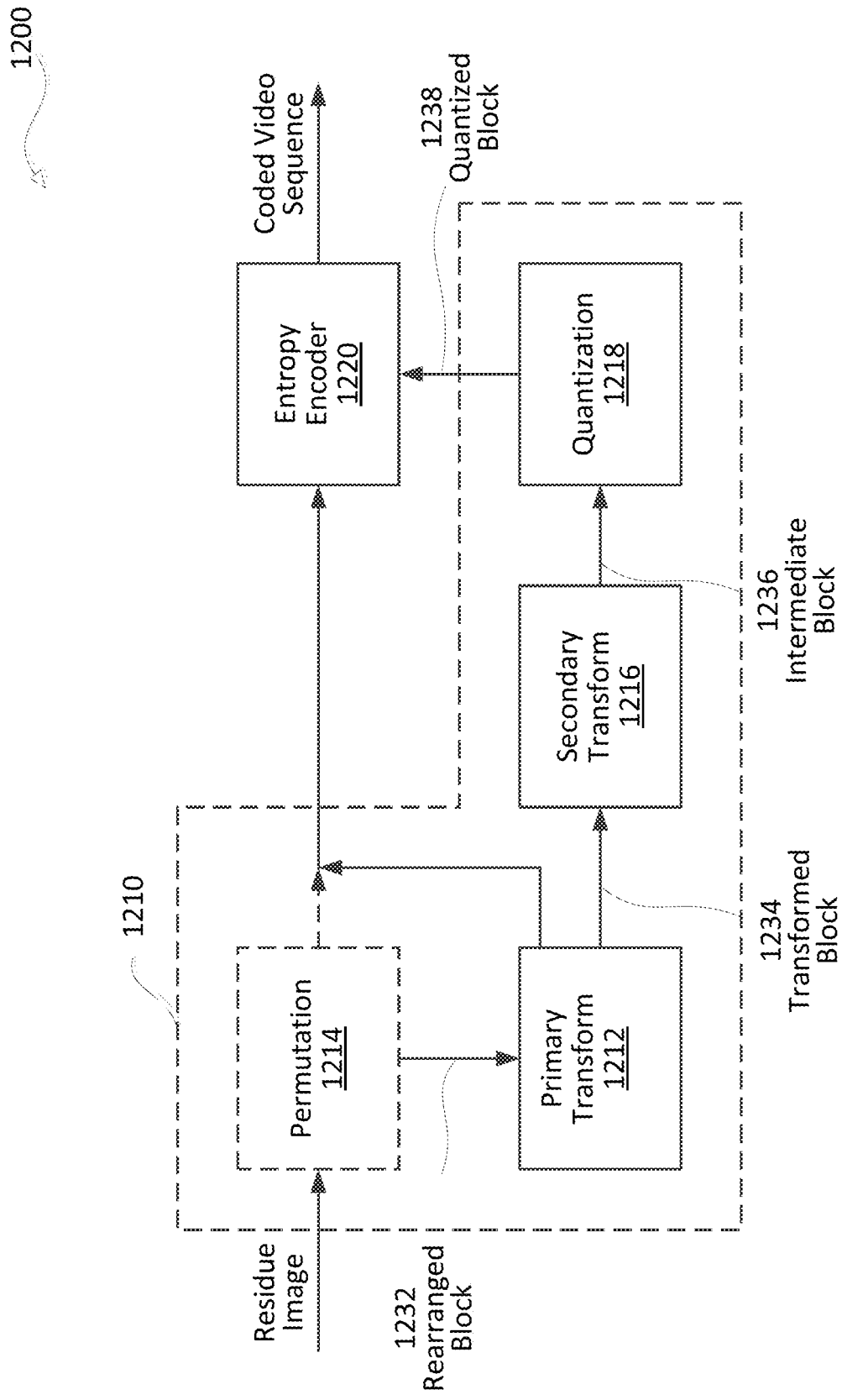
FIG. 12 shows a block diagram of a residue encoder (1210) and an entropy encoder (1220) and in an encoder (1200) in accordance with an embodiment.

FIG. 12 shows a block diagram of a residue encoder (1210) and an entropy encoder (1220) and in an encoder (1200) in accordance with an embodiment. The decoder (1200) is configured to receive a residue image of a current block and encode the residue image into a coded video sequence. In some examples, the encoder (1200) corresponds to the video encoder (403), (603), or (703).

In the FIG. 12 example, the encoder (1200) includes a residue encoder (1210) coupled with an entropy encoder (1220). In some examples, the entropy encoder (1220) corresponds to the entropy coder (645) or the entropy decoder (725), and the residue encoder (1210) corresponds to the coding engine (632) or the residue encoder (724). Accordingly, configurations and features of the encoder (1200), the entropy encoder (1220), and the residue encoder (1210) that are the same or similar to those described with reference to FIGS. 4, 6, and 7 may be simplified or omitted. Moreover, in some embodiments, the encoder (1200) includes other components in addition to the entropy encoder (1220) and the residue encoder (1210).

In the FIG. 12 example, the residue encoder (1210) includes a permutation unit (1214), a primary transform unit (1212), a secondary transform unit (1216), and a quantization unit (1218). In some embodiments, not all components of the residue encoder (1210) are depicted and illustrated in FIG. 12. Also, various units described herein may be implemented using hardware circuitry, processing circuitry executing instructions, or a combination thereof.

The permutation unit (1214) can rearrange a residue image of a current block based on a permutation process and provides permutation process information to the entropy decoder (1210). The permutation unit (1214) thus can output a rearranged block (1232). In some examples, when the permutation unit (1214) is omitted or disabled, the residue image is used as the rearranged block (1232).

The primary transform unit (1212) can receive the rearranged block (1232) and perform a primary transform process based on one or more primary transforms to convert the rearranged block (1232) from a spatial domain to a frequency domain and output a transformed block (1234). The primary transform unit (1212) can forward the one or more primary transforms used for performing the primary transform process to the entropy decoder (1210).

The secondary transform unit (1216) can perform a secondary transform process based on a secondary transform on a specific portion of the transformed block (1234) to obtain an intermediate block (1236). In some examples, the specific portion of the transformed block (1234) corresponds to a low frequency portion of the transformed block (1234). In some examples, the specific portion of the transformed block (1234) corresponds to a top-left portion of the transformed block (1234). In some examples, when secondary transform unit (1216) is omitted or disabled, the transformed block (1234) is used as the intermediate block (1236).

The quantization unit (1218) can receive the intermediate block (1236) and generate a quantized block (1238) based on determined quantization factors and/or quantization scaling matrices and output the quantized block (1238) to the entropy decoder (1210). The quantization unit (1218) can also forward the information regarding the adopted quantization factors and/or quantization scaling matrices to the entropy decoder (1210).

Finally, the entropy decoder (1210) can encode the quantized block (1238) and all related control information in a coded video sequence.

In some embodiments, a primary transform process performed by an encoder can be an inverse of a corresponding primary transform process performed by a decoder. In some embodiments, a secondary transform process performed by an encoder can be an inverse of a corresponding secondary transform process performed by a decoder.

As illustrated with reference to FIG. 9, because the secondary transform for a current block can be determined based on one or more primary transforms and intra prediction mode for the current block, separate signaling of control information or indices for the secondary transform can be omitted. Also, during the encoding process, the secondary transform and/or some or all control information for a chroma block can be determined in association with one or more primary transforms for the current block or a collocated luma block, and additional coding trials for such control information can be skipped. Accordingly, coding efficiency can be improved and computational resources for encoding the images can be reduced.

Figure 13:
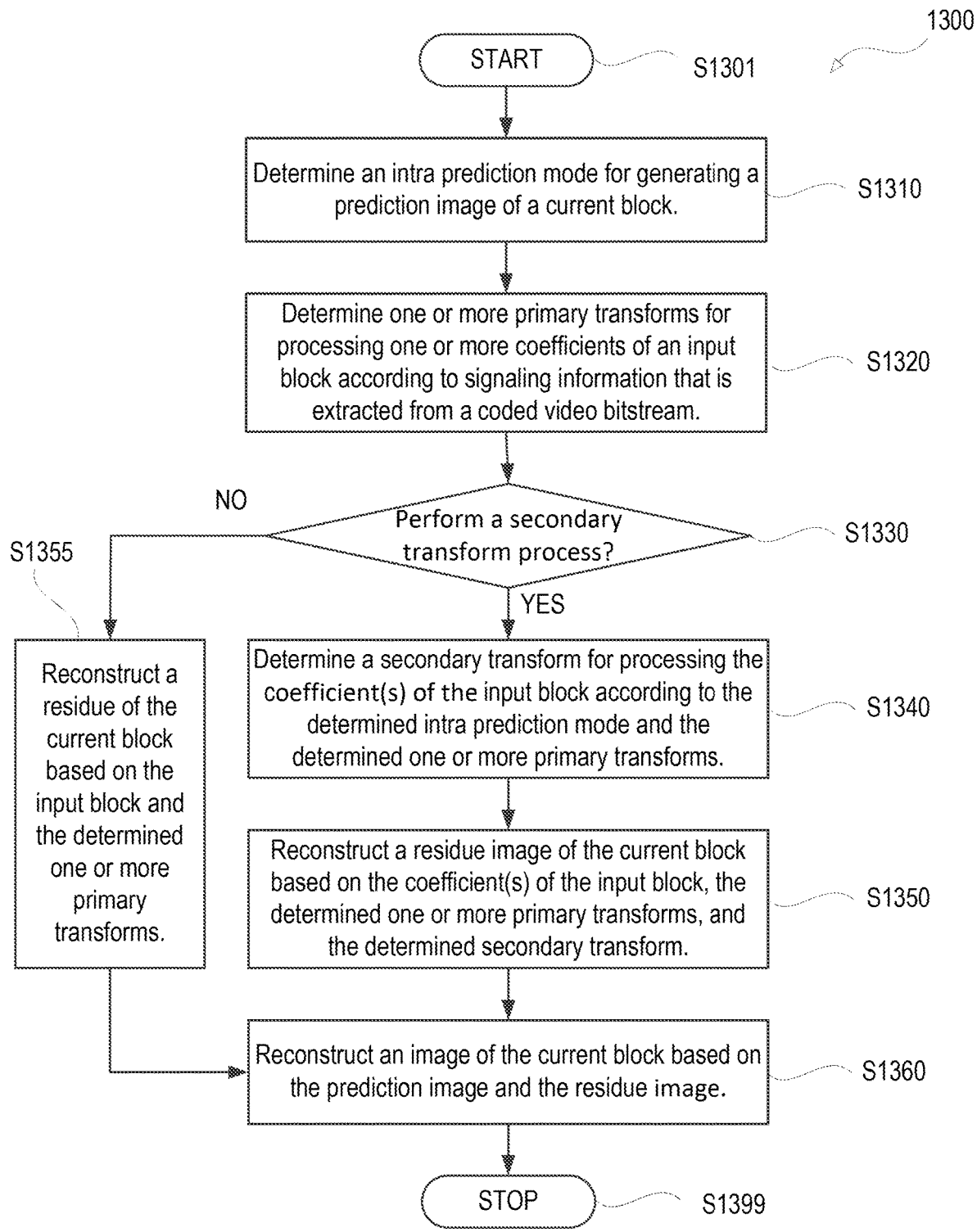
FIG. 13 shows a flow chart outlining a decoding process (1300) according to an embodiment of the disclosure.

FIG. 13 shows a flow chart outlining a decoding process (1300) according to an embodiment of the disclosure. The process (1300) can be used in the reconstruction of a block coded in intra mode, including reconstructing a residue image of the block. In some embodiments, one or more operations may be performed before or after process (1300), and some of the operations illustrated in FIG. 13 may be reordered or omitted.

In various embodiments, the process (1300) can be executed by processing circuitry, such as the processing circuitry in the terminal devices (310), (320), (330) and (340), the processing circuitry that performs functions of the video decoder (410), (510), or (810), the processing circuitry that performs functions of the video decoder (900), and the like. In some embodiments, the process (1300) is implemented in software instructions, thus when the processing circuitry executes the software instructions, the processing circuitry performs the process (1300). The process starts at (S1301) and proceeds to (S1310).

At (S1310), an intra prediction mode for generating a prediction image of a current block is determined. In some examples, based on the intra prediction mode, the prediction image of the current block can be generated as illustrated with reference to FIGS. 4, 5, and 8.

At (S1320), one or more primary transforms for processing one or more coefficients of an input block is determined according to signaling information that is extracted from a coded video bitstream. For example, a decoding controller or an entropy encoder can determine one or more primary transforms for processing the one or more coefficients of the input block based on control information signaled using the coded video bitstream, as illustrated with reference to FIG. 9.

At (S1330), whether to perform a secondary transform process for processing the one or more coefficients of the input block is determined based on at least the one or more primary transforms for processing the one or more coefficients of the input block, as illustrated with reference to FIG. 9. When it is determined that the secondary transform process is to be performed, the process proceeds to (S1340). When it is determined that the secondary transform process is not to be performed, the process proceeds to (S1355).

At (S1340), a secondary transform for processing the one or more coefficients of the input block is determined according to the determined intra prediction mode and the determined one or more primary transforms. For example, a decoding controller or an entropy encoder can determine the secondary transform for processing the one or more coefficients of the input block based on the determined intra prediction mode and the determined one or more primary transforms, as illustrated with reference to FIG. 9.

At (S1350), a residue image of the current block is reconstructed based on the one or more coefficients of the input block, the determined one or more primary transforms, and the determined secondary transform. For example, a residue decoder can reconstruct the residue image, as illustrated with reference to FIG. 9.

On the other hand, at (S1355), a residue image of the current block is reconstructed based on the one or more coefficients of the input block and the determined one or more primary transforms, and the secondary transform process is skipped. For example, a residue decoder can reconstruct the residue image, as illustrated with reference to FIG. 9.

At (S1360), an image of the current block is reconstructed based on the prediction image and the residue image, as illustrated with reference to FIGS. 4, 5, and 8.

Then, the process proceeds to (S1399) and terminates.

Figure 14:
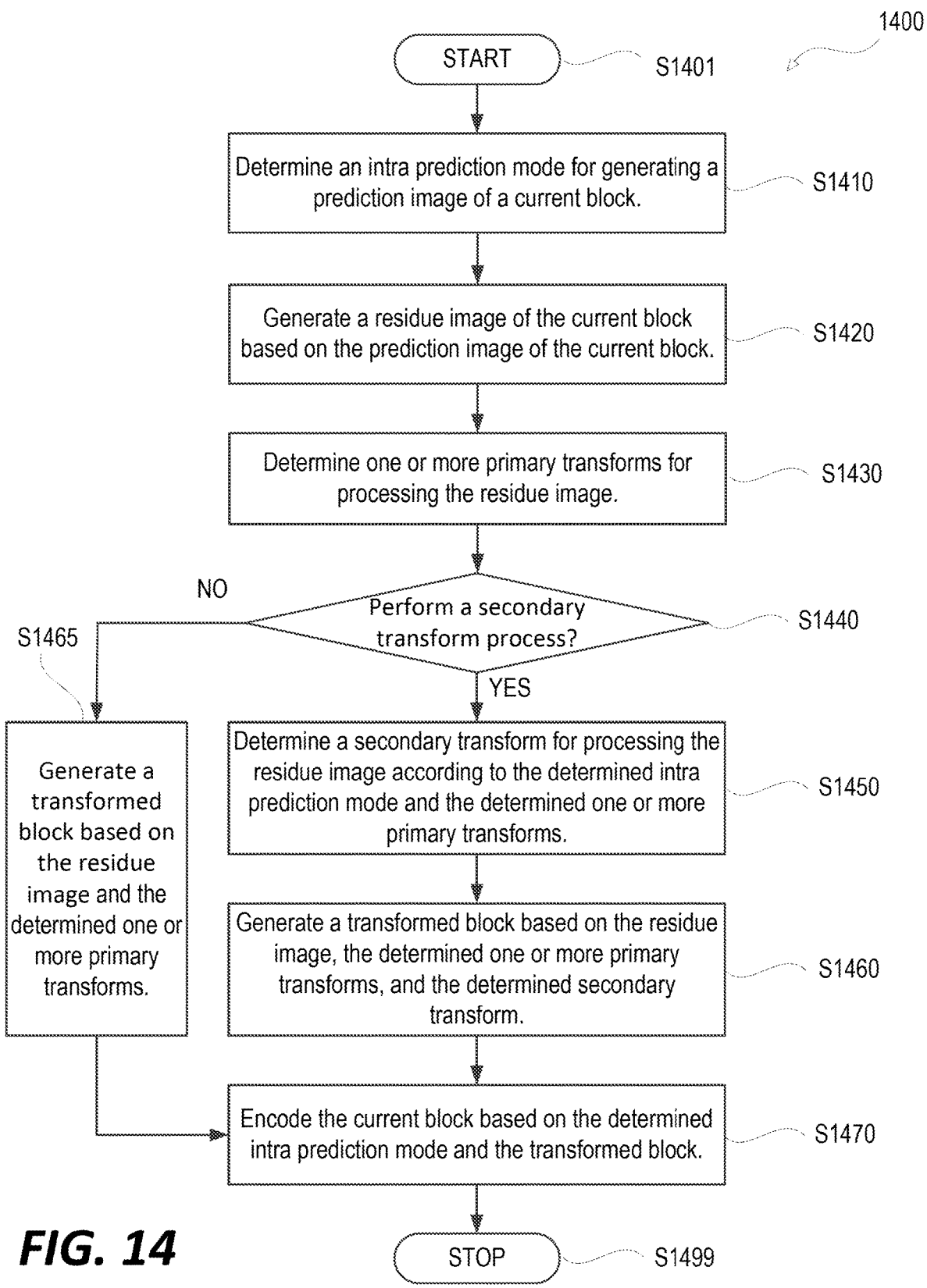
FIG. 14 shows a flow chart outlining an encoding process (1400) according to an embodiment of the disclosure.

FIG. 14 shows a flow chart outlining an encoding process (1400) according to an embodiment of the disclosure. The process (1400) can be used in the encoding of a block coded in intra mode, including encoding a residue image of the block. In some embodiments, one or more operations may be performed before or after process (1400), and some of the operations illustrated in FIG. 14 may be reordered or omitted.

In various embodiments, the process (1400) can be executed by processing circuitry, such as the processing circuitry in the terminal devices (310), (320), (330) and (340), the processing circuitry that performs functions of the video encoders (403), (603), and (703), the processing circuitry that performs functions of the video encoder (1200), and the like. In some embodiments, the process (1400) is implemented in software instructions, thus when the processing circuitry executes the software instructions, the processing circuitry performs the process (1400). The process starts at (S1401) and proceeds to (S1410).

At (S1410), an intra prediction mode for generating a prediction image of a current block is determined. In some examples, based on the intra prediction mode, the prediction image of the current block can be generated as illustrated with reference to FIGS. 4, 6, and 7.

At (S1420), a residue image of the current block is generated based on the prediction image of the current block. For example, a encoder can generate the residue image, as illustrated with reference to FIGS. 4, 6, and 7.

At (S1430), one or more primary transforms for processing the residue image is determined by testing various trial encoding settings, as illustrated with reference to FIGS. 4, 6, and 7.

At (S1440), whether to perform a secondary transform process for processing the residue image is determined based on at least the one or more primary transforms for processing the residue image, as illustrated with reference to FIG. 12. When it is determined that the secondary transform process is to be performed, the process proceeds to (S1450). When it is determined that the secondary transform process is not to be performed, the process proceeds to (S1465).

At (S1450), a secondary transform for processing the residue image is determined according to the determined intra prediction mode and the determined one or more primary transforms. For example, an encoding controller can determine the secondary transform for processing the residue image based on the determined intra prediction mode and the determined one or more primary transforms, as illustrated with reference to FIG. 12.

At (S1460), a transformed block is generated based on the residue image, the determined one or more primary transforms, and the determined secondary transform. For example, a residue encoder can reconstruct the residue image, as illustrated with reference to FIG. 12.

On the other hand, at (S1465), a transformed block is generated based on the residue image and the determined one or more primary transforms, and the secondary transform process is skipped. For example, a residue encoder can reconstruct the residue image, as illustrated with reference to FIG. 12.

At (S1470), the current block can be encoded based on the determined intra prediction mode and the transformed block, as illustrated with reference to FIGS. 4, 6, and 7.

Then, the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
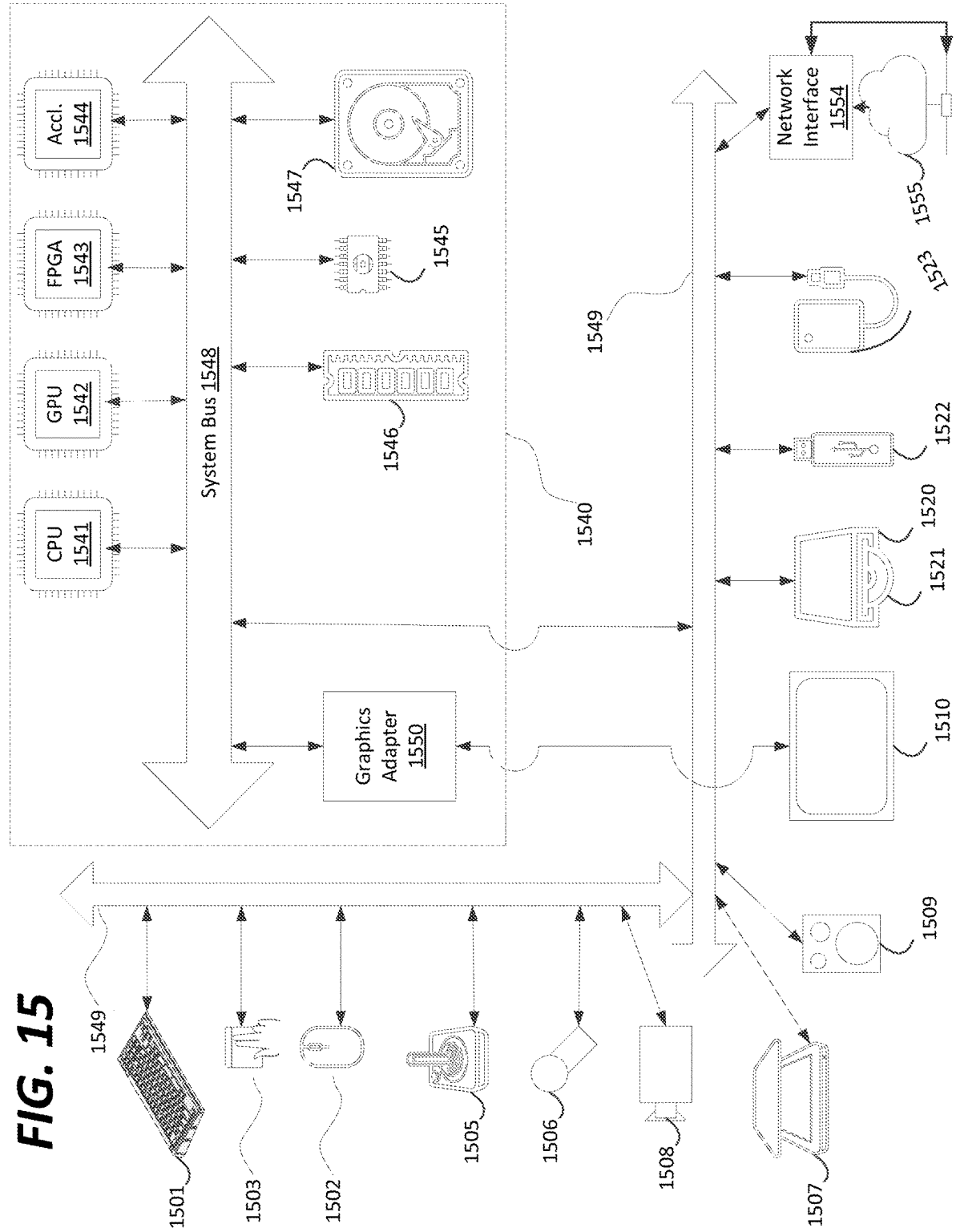
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hard-wired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   determining an intra prediction mode for generating a prediction image of a current block;
   determining a pair of transforms including a horizontal transform and a vertical transform that are transforms of a default type for performing a primary transform process for the current block when a first flag extracted from a coded video bitstream has a first value;
   determining that a secondary transform process is not to be performed for the current block when the first flag extracted from the coded video bitstream has the first value;
   determining the pair of transforms for performing the primary transform process based on a transform index extracted from the coded video bitstream when the first flag extracted from the coded video bitstream has a second value;
   determining that the secondary transform process is to be performed for the current block when the first flag extracted from the coded video bitstream has the second value;
   when the secondary transform process is determined to be performed,
      determining a secondary transform for performing the secondary transform process according to the determined intra prediction mode and the determined pair of transforms, and
      reconstructing a residue image of the current block based on one or more coefficients of an input block extracted from the coded video bitstream, the determined pair of transforms, and the determined secondary transform;
   when the secondary transform process is determined not to be performed,
      reconstructing the residue image of the current block based on the one or more coefficients of the input block and the determined pair of transforms; and
   reconstructing an image of the current block based on the prediction image and the residue image of the current block.

2. The method of claim 1, wherein
the determining the secondary transform includes identifying one of a plurality of secondary transforms that is associated with a combination of the intra prediction mode and a corresponding one of a plurality of pairs of horizontal and vertical transforms, and
each of the plurality of secondary transforms is associated with a different one of the pairs of horizontal and vertical transforms.

3. The method of claim 1, wherein
the default type includes a DCT-II (Discrete Cosine Transform—Type II).

4. The method of claim 1, further comprising:
determining one or more primary transforms for a chroma block based on an intra prediction mode for the chroma block, one or more primary transforms determined for one or more collocated luma blocks according to signaling information extracted from the coded video bitstream, and one or more secondary transforms determined for the one or more collocated luma blocks.

5. The method of claim 1, further comprising:
determining one or more primary transforms for a chroma block based on one or more primary transforms determined for one or more collocated luma blocks and one or more secondary transforms determined for the one or more collocated luma blocks, only when the chroma block has a chroma component predicted by a Direct Mode.

6. The method of claim 1, wherein, when the first flag extracted from the coded video bitstream has the second value,
the determining the pair of transforms includes determining the horizontal transform and the vertical transform only from candidate transforms including a DCT-II (Discrete Cosine Transform—Type II) transform and a DST-VII (Discrete Sine Transform—Type VII) transform based on the transform index extracted from the coded video bitstream, and
the reconstructing the residue image is performed further based on performing a permutation process after performing the primary transform process, the permutation process being determined based on the determined intra prediction mode and the transform index.

7. The method of claim 1, wherein, when the first flag extracted from the coded video bitstream has the second value,
the determining the pair of transforms includes determining the horizontal transform and the vertical transform based on the intra prediction mode and the transform index extracted from the coded video bitstream when the intra prediction mode corresponds to one of a vertical mode and a horizontal mode.

8. The method of claim 1, wherein
the determining the pair of transforms includes, when the first flag extracted from the coded video bitstream has the second value and when the coded video bitstream includes the transform index that is for only one of the horizontal transform and the vertical transform,
determining the one of the horizontal transform and the vertical transform based on the transform index extracted from the coded video bitstream, and
determining the other one of the horizontal transform and the vertical transform to be a default transform.

9. An apparatus, comprising:
processing circuitry configured to:
determine an intra prediction mode for generating a prediction image of a current block;
determine a pair of transforms including a horizontal transform and a vertical transform that are transforms of a default type for performing a primary transform process for the current block when a first flag extracted from a coded video bitstream has a first value;
determine that a secondary transform process is not to be performed for the current block when the first flag extracted from the coded video bitstream has the first value;
determine the pair of transforms for performing the primary transform process based on a transform index extracted from the coded video bitstream when the first flag extracted from the coded video bitstream has a second value;
determine that the secondary transform process is to be performed for the current block when the first flag extracted from the coded video bitstream has the second value;
when the secondary transform process is determined to be performed,
determine a secondary transform for performing the secondary transform process according to the determined intra prediction mode and the determined pair of transforms, and
reconstruct a residue image of the current block based on one or more coefficients of an input block extracted from the coded video bitstream, the determined pair of transforms, and the determined secondary transform;
when the secondary transform process is determined not to be performed,
reconstruct the residue image of the current block based on the one or more coefficients of the input block and the determined pair of transforms; and
reconstruct an image of the current block based on the prediction image and the residue image of the current block.

10. The apparatus of claim 9, wherein the processing circuitry is configured to:
identify one of a plurality of secondary transforms that is associated with a combination of the intra prediction mode and corresponding one of a plurality of pairs of the horizontal transform and the vertical transform,
wherein each of the plurality of secondary transforms is associated with a different one of the pairs of horizontal and vertical transforms.

11. The apparatus of claim 9, wherein the default type includes a DCT-II (Discrete Cosine Transform—Type II).

12. The apparatus of claim 9, wherein
the processing circuitry is configured to determine one or more primary transforms for a chroma block based on an intra prediction mode for the chroma block, one or more primary transforms determined for one or more collocated luma blocks according to signaling information extracted from the coded video bitstream, and one or more secondary transforms determined for the one or more collocated luma blocks.

13. A non-transitory computer-readable medium storing instructions which when executed by a computer for video decoding causes the computer to perform:
determining an intra prediction mode for generating a prediction image of a current block;
determining a pair of transforms including a horizontal transform and a vertical transform that are transforms of a default type for performing a primary transform process for the current block when a first flag extracted from a coded video bitstream has a first value;

determining that a secondary transform process is not to be performed for the current block when the first flag extracted from the coded video bitstream has the first value;

determining the pair of transforms for performing the primary transform process based on a transform index extracted from the coded video bitstream when the first flag extracted from the coded video bitstream has a second value;

determining that the secondary transform process is to be performed for the current block when the first flag extracted from the coded video bitstream has the second value;

when the secondary transform process is determined to be performed, determining a secondary transform for performing the secondary transform process according to the determined intra prediction mode and the determined pair of transforms, and reconstructing a residue image of the current block based on one or more coefficients of an input block extracted from the coded video bitstream, the determined pair of transforms, and the determined secondary transform;

when the secondary transform process is determined not to be performed, reconstructing the residue image of the current block based on the one or more coefficients of the input block and the determined pair of transforms; and reconstructing an image of the current block based on the prediction image and the residue image of the current block.

* * * * *